United States Patent

[11] 3,622,841

[72] Inventor Demir S. Zoroglu
Scottsdale, Ariz.

[21] Appl. No. 29,000
[22] Filed Apr. 16, 1970
[45] Patented Nov. 23, 1971
[73] Assignee Motorola, Inc.
Franklin Park, Ill.

[54] TRIAC HAVING INCREASED COMMUTATING SPEED
8 Claims, 6 Drawing Figs.

[52] U.S. Cl. ........................................................ 317/235 AA,
317/235 AA, 317/235 AJ
[51] Int. Cl. ........................................................ H01l 9/12
[50] Field of Search ............................................ 317/235
(28), 41.1

[56] References Cited

UNITED STATES PATENTS

| | | | |
|---|---|---|---|
| 3,372,318 | 3/1968 | Tefft | 317/235 |
| 3,277,310 | 10/1966 | Schreiner | 307/88.5 |
| 3,350,611 | 10/1967 | Scace | 317/235 |
| 3,251,004 | 5/1966 | Shombert et al. | 331/107 |

*Primary Examiner*—John W. Hackert
*Assistant Examiner*—E. Wojciechowicz
*Attorney*—Mueller & Aichele

ABSTRACT: A triac is provided having two portions of several layers thereof including particularly the main layer insulated from each other, whereby when the voltage applied to the main electrodes of the triac reverses, the charge stored in a portion of the main layer of the triac during current flow in one direction thereof cannot flow into the other portion of the main layer. This insulation therefore increases the highest commutating speed of the resultant triac over that of known triacs.

INVENTOR.
Demir S. Zoroglu
BY
Mueller, Aichele & Rauner
ATTY'S

INVENTOR.
Demir S. Zoroglu

BY
Mueller, Aichele & Rauner
ATTY'S

TRIAC HAVING INCREASED COMMUTATING SPEED

BACKGROUND

This invention relates to triacs having increased commutating speed.

A bilateral triode switch, also known as a triac, is a known multilayer solid state switching device having at least two main electrodes and a control electrode. The triac is nonconductive in either direction when the voltage between the control electrode and a main electrode is below a certain or firing value and the triac is conductive in both directions when the voltage is between the control electrode and a main electrode is greater than a predetermined value. The control electrode loses control of the conductivity of the triac once it becomes conductive, however, the triac becomes nonconductive (assuming no firing voltage on the control electrode) as soon after the voltage applied to the main electrode drops to zero as it takes the charge on its main layer to dissipate. Therefore, a triac does not become nonconductive instantaneously after the voltage applied to the main electrodes thereof becomes zero and the triac may remain conductive although the voltage across the main electrodes thereof has gone through zero if the frequency applied to the main electrodes is high compared to the time it takes the main layer to discharge. The conductivity of the triac would then carry over to the next half cycle of the voltage applied to the main electrodes of the triac, whereby the triac would stay conductive as long as the high frequency alternating current is applied to the main electrodes thereof and the usefulness of the triac would be limited to lower applied frequencies.

It is an object of this invention to provide a triac which becomes nonconductive more quickly after the voltage applied to the main electrodes thereof reduces to zero than with known triacs.

SUMMARY

In accordance with the invention, a triac is provided having one portion of the main layer thereof conductively cut off from another portion of the main layer thereof. In a practical embodiment thereof, a slot is provided nearly completely through the triac and the several PN junctions cut by the slot may be passivated as by covering the exposed surfaces of the slot by an insulator such as silicon dioxide. To restore the mechanical strength of the triac, the remainder of the slot is filled by an insulator as be depositing polycrystalline silicon in the slot. A triac results which can be commutated at a higher speed than known triacs.

DESCRIPTION

Figures 1, 2:
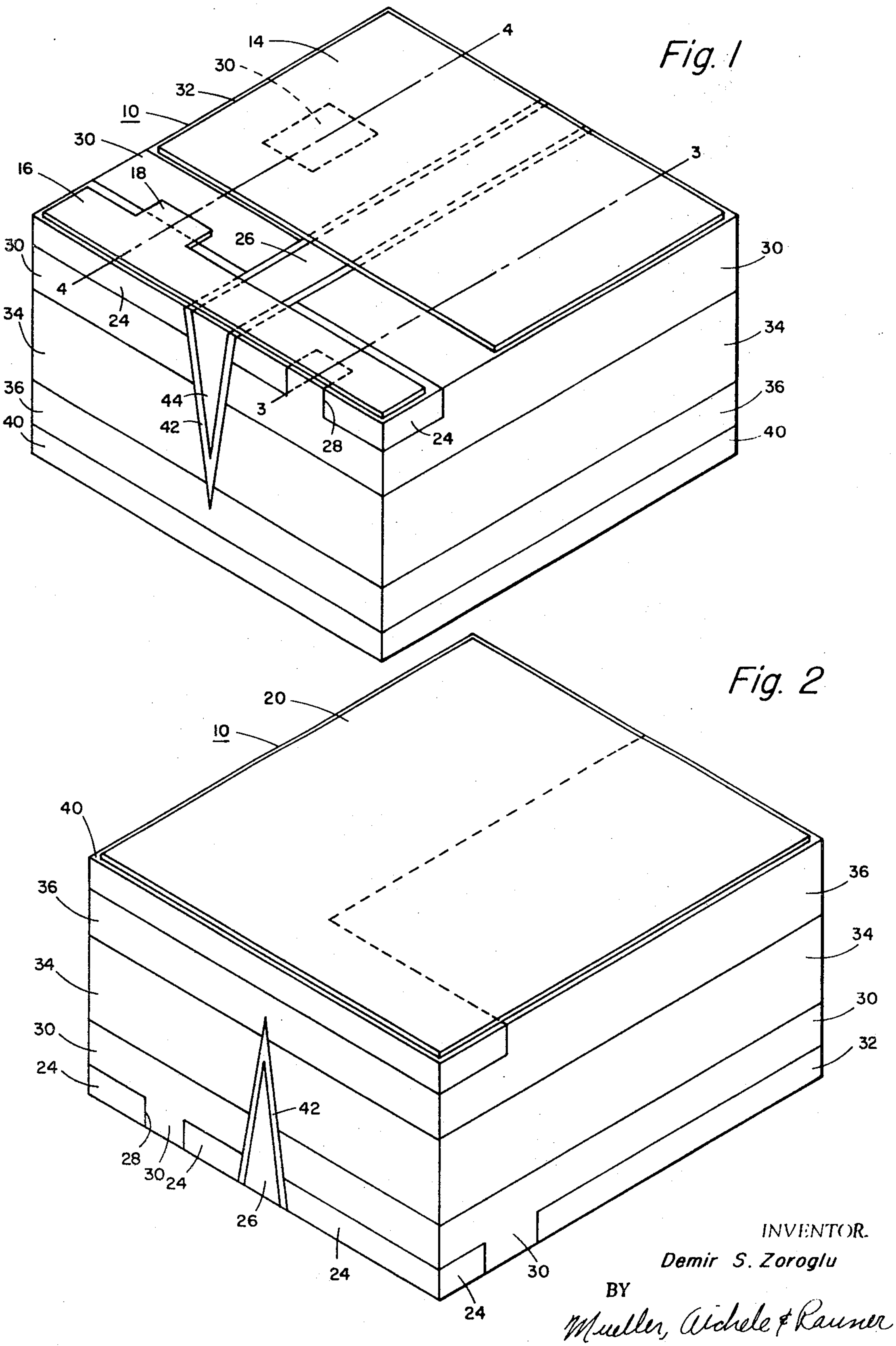
Figures 3, 4, 5, 6:
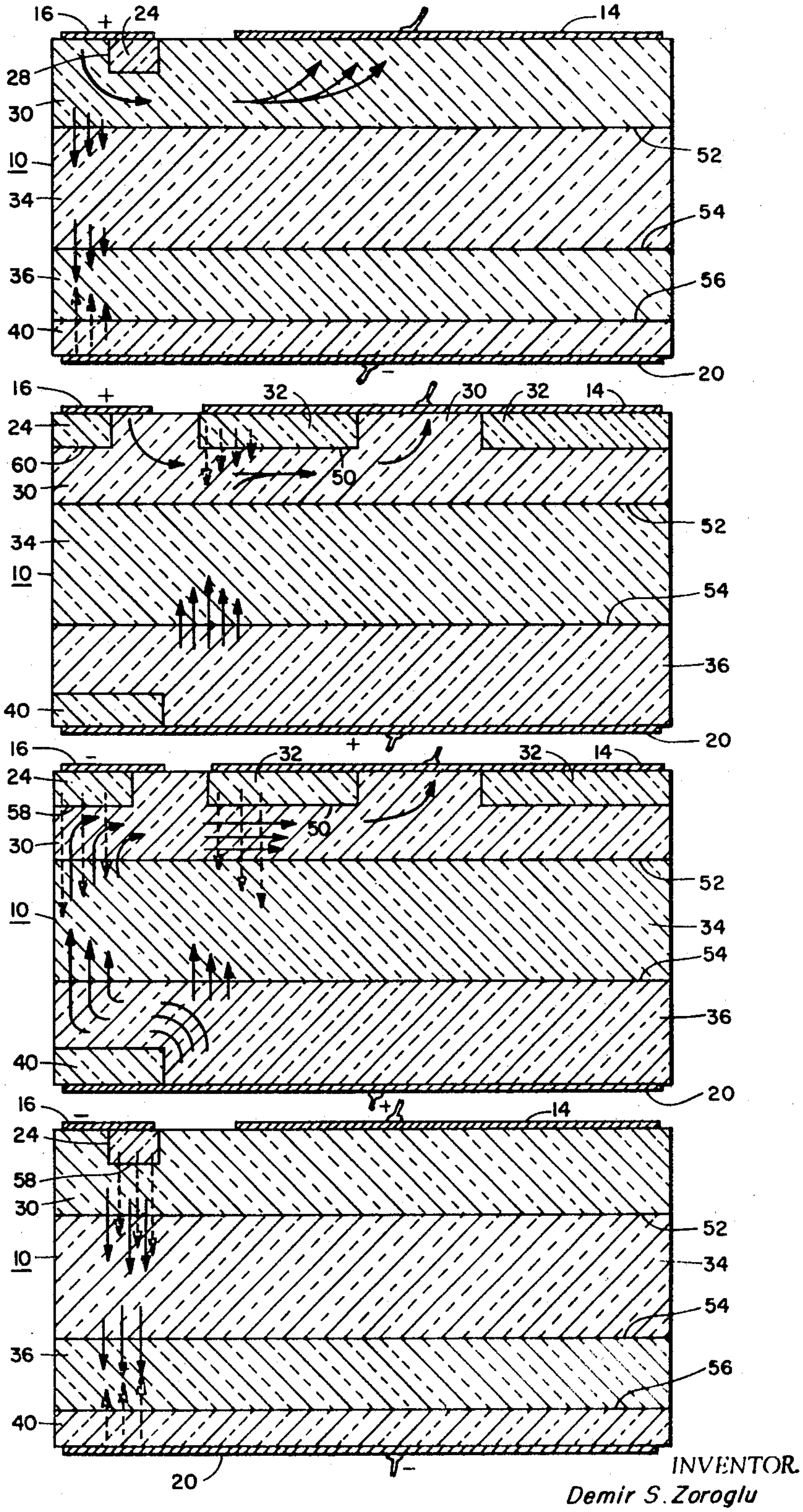

The invention will be better understood upon reading the following description in connection with the accompanying drawing in which FIG. 1 is a top view of a triac according to this invention, FIG. 2 is a bottom view of the triac of FIG. 1, FIGS. 3 and 6 are cross-sectional views of the triac of FIG. 1 on line 3—3 thereof, and FIGS. 4 and 5 are cross-sectional views of the triac of FIG. 1 on lines 4—4 thereof.

In FIG. 1, the top of the triac 10 is the cathode side thereof. Two electrodes 14 and 16 are deposited on the top of the triac 10. The electrode 14 is the main or cathode electrode and it covers the whole width of the major part of the cathode side of the block, leaving an end region of the cathode side that is not covered by the electrode 14. One end of the triac 10 is covered by the control electrode 16. The electrode 16 is as wide as is the triac 10 and the triac 10 and the electrode 16 is uniform in the longitudinal dimension of the triac 10 except that a tongue 18 thereof extends from the middle of a lateral half of the electrode 16 for purposes to be explained. The electrodes 16 and 14 are spaced from each other as is shown in FIG. 1. Another main or anode electrode 20 covers almost completely the bottom or anode side of the triac 10 as shown in FIG. 2.

The structure of the triac 10 will be described in connection with FIGS. 1, 2, 3 and 4 and FIGS. 3, 4, 5 and 6 are useful in describing the operation of the triac 10.

An N type gate layer 24 extends, except for the slot 26 therethrough and for a notch 28 therein, across the upper near edge of the triac 10, as viewed in FIG. 1. A P type top base layer 30 underlies the gate layer 24 and extends into the notch 28 therein, on both sides of the slot 26. As will be seen in FIG. 1, on the right side of the slot 26, the P layer 30 extends from the slot 26 to the outward edge of the triac 10 in a lateral direction and extends the length of the triac 10 in the longitudinal direction thereof. On the left of the slot 26, the P layer 30 extends from the slot 26 to the edge of the triac 10 in the width or lateral dimension thereof and also extends the length of the triac 10 in its longitudinal dimension. However, on the left of the slot 26, the P layer 30 is not only under the gate layer 24 but it is under an N layer 32, see also FIG. 2. The P layer 30 comprises the right hand part of the top of the triac 10 except for what is covered by the gate layer 24. The P layer 30 at the left of the slot 26 comprises the top of the triac only for the distance between the edge of the electrode 16 (but not its tongue 18) and the electrode 14. The P layer 30 also extends up through the central part of the N layer 32 as shown in FIG. 1. The tongue 18 of the electrode 16 makes contact with the P area 30 beyond the control layer 24, whereby the control electrode 18 makes contact with both parts of the control layer 24 and with the P layer 30 on both sides of the slot. The cathode electrode 14 makes contact with the P layer 30 on both sides of the slot 26 and the cathode electrode 14 makes contact with the N layer 32 on the left of the slot 26, all as viewed in FIG. 1.

A main base N layer 34 is substantially uniform in thickness and extends in each lateral direction from the slot 26 to the edge of the triac. A bottom base P layer 36 is under the whole extent of the N layer 34, however, while the slot 26 cuts into the bottom base layer 36, the slot 26 does not sever the bottom base layer 36. As shown in FIG. 2, the bottom base layer 36 has an L-shaped notch therein for receiving a bottom N layer 40. The long portion of the L-shaped bottom layer 40 runs the length of the triac 10 on the left side of the triac 10 as viewed in FIG. 2 and is about one-half the width of the triac 10. The short portion of the L is larger than the width of the control layer 24, and extends the full width of the triac at the control electrode end thereof. The thickness of the N layer 40 may vary in accordance with the desired characteristic of the triac. The anode electrode 20 contacts both the lower surface of the P layer 36 and the lower surface of the N layer 40.

The slot 26 may be made in the block before the block is processed to produce the triac 10, or if desired, it may be made after this processing. All the PN junctions exposed by the walls of the slot 26 are passivated as by growing or depositing a silicon dioxide layer 42 on the walls of the slot 26 in any known manner. The unfilled volume of the slot 26 may be filled with an insulator such as polycrystalline silicon 44. It is noted that only part of the layer 36 and none of the layer 40 is penetrated by the slot 26.

The operation of the inventive triac follows, referring to FIG. 3 and assuming that the voltage on the gate electrode 16 is positive with respect to the cathode electrode 14 and that the anode electrode is negative with respect to the cathode electrode 14. Current flows from the electrode 16 to the electrode 14 as shown by the solid horizontal arrows in the layer 30, producing a positive potential in the end of the layer 30 near the notch 28. The junction 52 between the layers 30 and 34 becomes forward biased to the point where holes, as indicated by the vertical solid arrows that extend across the PN junction 52, flow from the layer 30 to the layer 34. Some of these holes are collected by the PN junction 54 between the layers 34 and 36, which results in the PN junction 56 between the layers 36 and 40 becoming more forwardly biased. Electrons are then caused to flow, as shown by the dotted arrows across the layer 40 to the layer 36 through the PN junction 56. These electrons are collected by the junction 54 causing the main layer 34 to become even more negative whereby more holes are injected from layer 34 into layer 36, and very soon the triac 10 becomes fully conductive between the anode electrode 20 and the cathode electrode 14.

Now let is be assumed that the gate electrode 16 is positive with respect to the cathode electrode 14 and that the anode electrode 20 is positive with respect to the cathode electrode 14. Referring to FIG. 4, current flows from the gate electrode 16 to the cathode electrode 14 making the potential at or near the corner of the portion of the layer 32 that is nearest the layer 24 to become positive. When this voltage exceeds about one half a volt, the near part of the PN junction 50 between the layers 32 and 30 becomes conductive and electrons indicated by the dotted arrows are injected from the layer 32 across the junction 50 and through the layer 30 and are collected by the PN junction 52. When these electrons pass into the main layer 34 they lower its potential with respect to the layer 36 and so holes are injected into the main layer 34 from the layer 36 through the PN junction 54. In a very short time the number of holes increases to the point where the triac is fully conductive between the positive anode electrode 20 and the negative cathode electrode 14.

Now let it be assumed that the gate electrode 16 is negative and that the anode electrode 20 is positive with respect to the cathode electrode 14. Referring to FIG. 5, it is noted that the PN junction 58 between the gate layer 24 and the layer 30 is forward biased whereby the gate layer 24 injects electrons into the layer 30 as shown by the left hand vertical dotted arrows. These electrons are collected by the junction 52 which lowers the the potential of the main layer 34 whereby holes are injected into the main layer 34 from the layer 36 as indicated by the lower solid arrows through the PN junction 54. These electrons are collected by the junction 52 under the left hand end of the left hand portion of the layer 32, causing flow of holes towards the electrode 14, causing a positive potential to build up at the end of the layer 32 near the control layer 24. Electrons then flow from the left hand portion of the layer 32 into the layer 34 as shown by the right hand dotted arrows and the triac becomes conductive with the cathode electrode 14 negative and the anode electrode 20 positive with respect to each other.

Let it be assumed that the gate electrode 16 and the anode electrode 20 are both negative with respect to the cathode electrode 14. Then as shown in FIG. 6, the junction 58 between the gate layer 24 and the layer 30 is forward biased, whereby electrons are injected into the layer 30 from the layer 24. These electrons are collected by the PN junction 52 and therefore the potential of the main layer 34 is lowered with respect to the layer 30. Therefore, holes are injected from the layer 30 into the layer 34 and some of these holes are collected by the PN junction 54 whereby the potential of the layer 36 is raised with respect to the layer 40 whereby electrons are injected from the layer 40 into the layer 36. These electrons being collected by the PN junction 54 further reduces the potential of the layer 34 causing flow of more holes thereinto from layer 30. This regenerative action continues and very soon current flows from the positive cathode electrode 14 to the relatively negative anode electrode 20.

The above explanation of the operation of the triac 10 applies to many triacs of the structure shown whether it has the slot 26 therein or not. As will be noted, when the voltage of the anode 20 is positive with respect to the cathode, that the starting action takes place at the left side of the slot 26 in FIG. 1, as shown with reference to the section 4—4 and to FIGS. 4 and 5, and that when the voltage of the anode 20 is negative with respect to the cathode 14 that the starting action takes place to the right of the slot 26 in FIG. 1, as shown with reference to the section 3—3 and to FIGS. 3 and 6. The polarity of the control electrode does not change this location of starting action. It is noted that charges stored in the main layer 34 have an active affect on the conductivity of the triac. Also in the operation of a triac, a charge is stored in the main layer 34 whenever the triac is conductive, the charge being stored on one side or the other of the slot 26 where the triac is started and where most of the conduction takes place. It is also noted that the conduction is through the portion of the triac on one side of the slot 26 for one polarity of the anode voltage and through the portion of the triac on the other side of the slot 26 for reversed anode voltage. Therefore, if the charge in the main layer 34 is prevented from flowing from one side of the triac to the other, as by the slot 26, then the charge stored in the triac by current flow cannon affect the starting characteristics of the triac when the current flow through the portion of the triac on the other side of the slot is in the opposite direction. Therefore, the triac disclosed can commutate, that is control current flow through it whose voltage reverses, as a frequency much higher than the commutating frequency of known triacs.

Since the described triac can be made in any known manner, its manner of construction is not here disclosed.

In the claims:

1. A bilateral triac type switching device having an increased commutation rate comprising:

a top base layer and a main layer both of semiconductive material arranged one on top of another and a control layer of semiconductor material in a first portion of said top base layer, each of said layers having a slot running completely there through in a direction which completely separates each of said layers into two electrically isolated sections, said slot extending from a top surface of said device down through each of said layers and isolating carriers in vertically adjacent sections of said layers to one side of said slot from charged particles in corresponding sections on the other side of said slot;

a cathode region of semiconductive material in a second portion of said top base layer;

a bottom base layer of semiconductive material adjacent the bottom of said main layer, said slot extending at least to said bottom base layer;

an anode region in a portion of said bottom base layer;

means for contacting said control layer and a portion of said top base layer;

means for contacting said cathode region and another portion of said top base layer; and means for contacting said anode region and a portion of said bottom base layer, such that carriers in said top base, main and control layers to one side of said slot are not affected by charged particles in corresponding layers on the other side of said slot which would inhibit the onset of current flow through said device, whereby the charged particles in said main layer due to current flow through said device in one direction do not oppose the current flow in the opposite direction, thereby enabling an increased speed of commutation for said device, with current in one direction going through said device to one side of said slot while current in an opposite direction goes through said device to the other side of the said slot.

2. The invention of claim 1 in which the surface of said slot is coated with an insulator.

3. The invention of claim 2 in which the remainder of said slot is filled with a solid filling material.

4. A high commutating rate bilateral triac switch comprising of a block of semiconductor material having an upper and a lower surface, said block including a gate layer of a first conductivity type having a surface comprising part of the upper surface of said block, said gate layer having a notch in said surface thereof, a top base layer of a second conductivity type underlying said gate layer and extending in said notch and having a surface comprising a part of the upper surface of said block, a third layer of the first conductivity type and being positioned on said top base layer, a surface of said third layer comprising a portion of the upper surface of said block, said third layer having a hole in said surface thereof, said top base layer extending up through said hole in said third layer to form part of said upper surface of said block, a main layer of the first conductivity type underlying said top base layer, a bottom layer of the second conductivity type underlying said main layer and having a notch in the under surface thereof, a portion of said second conductivity type bottom layer forming a portion of the bottom surface of said block, a further layer of the first conductivity type positioned in said notch in said bottom layer, the bottom surface of said further layer comprising the other portion of the bottom surface of said block, and a slot in said block extending down from said top surface completely cutting said gate layer and said top base layer and said main layer into two portions, said third layer being to one side of said slot, such that charged particles to one side of said slot do not oppose carrier flow in layers on the other side of said slot, whereby the commutating rate of said switch is increased.

5. The invention of claim 4 in which a control, a cathode and anode electrodes are provided for said block, said control electrode contacting both portions of said gate layer and said top base layer on both sides of said slot, said cathode contacting said top base layer on one side of said slot and said third layer and said top base layer on the other side of said slot and said anode layer contacting both of said bottom layers.

6. The invention of claim 4 in which the inside of said slot is covered with an insulator.

7. The invention of claim 5 in which said control electrode contacts said top base layer that extends into said notch in said gate layer on one side of said slot and in which said control electrode contacts the top base layer on the other side of said slot.

8. The invention of claim 7 in which said cathode electrode contacts said top base layer that extends into said hole in said third layer.

* * * * *